US009785454B2

(12) United States Patent
van de Kamp

(10) Patent No.: US 9,785,454 B2
(45) Date of Patent: Oct. 10, 2017

(54) VIRTUAL SESSION BENCHMARKING TOOL FOR MEASURING PERFORMANCE AND/OR SCALABILITY OF CENTRALIZED DESKTOP ENVIRONMENTS

(71) Applicant: Login VSI B.V., Amsterdam (NL)

(72) Inventor: Jeroen van de Kamp, Amsterdam (NL)

(73) Assignee: LOGIN VSI B.V., Amsterdam (NL)

( * ) Notice: Subject to any disclaimer, the term of this patent is extended or adjusted under 35 U.S.C. 154(b) by 575 days.

(21) Appl. No.: 13/950,688

(22) Filed: Jul. 25, 2013

(65) Prior Publication Data
US 2015/0032436 A1 Jan. 29, 2015

(51) Int. Cl.
G06F 17/50 (2006.01)
G06F 9/455 (2006.01)
G06F 11/34 (2006.01)

(52) U.S. Cl.
CPC .......... G06F 9/455 (2013.01); G06F 11/3414 (2013.01); G06F 11/3433 (2013.01); G06F 11/3442 (2013.01); G06F 2201/815 (2013.01)

(58) Field of Classification Search
CPC ............. G06T 1/0021; G06F 17/30557; G06F 9/5077; G06F 1/3006; G06F 1/3203; G06F 9/455; G06F 9/5007; G06F 1/3209; G06Q 20/145; H04L 63/0272; H04L 47/10
See application file for complete search history.

(56) References Cited

U.S. PATENT DOCUMENTS

| | | | | |
|---|---|---|---|---|
| 8,902,248 B1* | 12/2014 | Bidarkar | ............... | G06F 17/246 345/619 |
| 2002/0166117 A1* | 11/2002 | Abrams | ............... | G06Q 20/145 717/177 |
| 2003/0023743 A1* | 1/2003 | Raphel | ................... | H04L 47/10 709/232 |
| 2005/0216235 A1 | 9/2005 | Butt et al. | | |
| 2006/0052921 A1* | 3/2006 | Bodin | ................. | B60R 16/0232 705/1.1 |
| 2007/0043860 A1* | 2/2007 | Pabari | ................... | G06F 9/5072 709/224 |
| 2009/0037914 A1* | 2/2009 | Chagoly | ............. | G06F 11/3006 718/101 |
| 2010/0070978 A1* | 3/2010 | Chawla | ................. | G06F 9/5077 718/105 |
| 2010/0161711 A1* | 6/2010 | Makhija | .................. | G06F 9/455 709/203 |

(Continued)

OTHER PUBLICATIONS

International Search Report and Written Opinion dated Dec. 8, 2014 in International Patent Application No. PCT/US2014/047671.

(Continued)

Primary Examiner — Kandasamy Thangavelu
(74) Attorney, Agent, or Firm — Vierra Magen Marcus LLP

(57) ABSTRACT

A method is disclosed for simulating user load and evaluating performance and/or capacity of SBC or VDI datacenter infrastructure. The method runs workloads on a virtual desktop infrastructure for an increasing number of virtual users. When the average response time of the infrastructure to perform operations exceeds a predetermined threshold, the number of simulated users at that time may be considered the capacity of the infrastructure.

20 Claims, 9 Drawing Sheets

(56) References Cited

U.S. PATENT DOCUMENTS

| | | | |
|---|---|---|---|
| 2010/0191854 A1* | 7/2010 | Isci | G06F 1/3203 |
| | | | 709/226 |
| 2011/0029970 A1* | 2/2011 | Arasaratnam | G06F 9/45558 |
| | | | 718/1 |
| 2011/0213894 A1* | 9/2011 | Silberstein | G06F 17/30557 |
| | | | 709/232 |
| 2012/0084580 A1* | 4/2012 | Harchol-Balter | G06F 1/3203 |
| | | | 713/310 |
| 2012/0281708 A1* | 11/2012 | Chauhan | H04L 63/0272 |
| | | | 370/401 |
| 2012/0311128 A1 | 12/2012 | Pechanec et al. | |
| 2013/0097426 A1* | 4/2013 | Agrawal | G06T 1/0021 |
| | | | 713/176 |
| 2014/0278623 A1* | 9/2014 | Martinez | G06F 8/36 |
| | | | 705/7.12 |

OTHER PUBLICATIONS

Voluntary Amendment dated Sep. 27, 2016 in Australian Patent Application No. 2014293254.
Response to Written Opinion filed Jan. 10, 2017 in European Patent Application No. 14748432.3.

\* cited by examiner

VIRTUAL SESSION BENCHMARKING TOOL FOR MEASURING PERFORMANCE AND/OR SCALABILITY OF CENTRALIZED DESKTOP ENVIRONMENTS

BACKGROUND

Server Based Computing (SBC) and hosted Virtual Desktop Infrastructure (VDI) solutions are used in enterprises today to provide a virtualized Windows desktop hosted in a datacenter to (remote) end users. These virtual desktops are hosted in the central datacenter and accessed by users remotely through a remote display protocol over a network such as a LAN, WAN, mobile broadband and the Internet. Both the VDI and SBC desktops run on shared server hardware in the datacenter. A virtual machine monitor, or hypervisor, creates and runs virtual machines in the datacenter, and makes it possible to run multiple virtual instances of a Windows desktop.

Currently, the VDI concept is often preferred over SBC, as this gives the most flexibility since each user works on their own personal Windows desktop instead of a shared and standardized Windows Server desktop. In SBC, multiple desktop sessions are provided from one Windows server instance. Consequently, the operating system is shared by the users. It is possible to provide a SBC environment while Windows Server is directly installed on the server hardware without a hypervisor. This is commonly called a bare-metal installation of Windows Server. However, it is common to virtualize Windows servers and run a SBC environment virtualized on the server hardware.

As a result, with both SBC and VDI, each desktop session is sharing all server hardware located in the datacenter, including the hypervisor, CPU, memory, network and storage. These server resources are limited per definition, and as a result each solution has a specific capacity. It is difficult if not impossible to predict what the capacity will be of SBC and VDI solutions, when the combination and specific configuration of hardware and software is not fully tested. This is an important topic to IT organizations, because ultimately it is necessary to understand how much hardware (server, network and storage) is required to be able to provide desktops to a given number of users.

One difficulty in making this determination is that there is very large number of different combinations possible to build a VDI or SBC environment. Both on a hardware and software level, technology is continuously innovated to improve the user experience and reduce hardware and software costs. Although functionally the same for the end-user, the underlying technologies differ wildly for each solution, and there are many vendors actively releasing new products in the VDI and SBC market.

Much of the innovation has either a positive effect on the capacity of the system (example: Storage IO accelerators) or negative effect on the capacity of the system (example: multimedia support for greater end-user experience). In addition, specific settings in the software and hardware can have a significant impact. It may be that the stack of hardware and software for the VDI and SBC solutions is identical in two different organizations. Still, the manner in which Windows and applications are configured and used can be fundamentally different in each organization. As a result, the capacity of two superficially identical VDI environments in two organizations can have a different capacity in practice.

Also, a VDI or SBC solution is comprised of many different software and hardware elements from different vendors that affect performance and capacity. Examples of these are: the virtual desktop broker software, the hypervisor, security software, office and business applications, server hardware, (shared) storage and network (both LAN and WAN).

It would be advantageous to be able to predict, before actual users are working in a deployed virtual desktop environment, what the capacity is of an individual server and a complete environment in the datacenter.

SUMMARY

Embodiments of the present technology, roughly described, pertain to a system and method for simulating user load and evaluating performance and/or capacity of SBC or VDI solutions. The present technology launches and runs workloads on a virtual desktop infrastructure for an increasing number of virtual users. When the average response time of the infrastructure to performed operations exceeds a predetermined threshold, the number of simulated users at that time may be considered the capacity of the infrastructure, referred to herein as VSIMax, named after the virtual session indexer (VSI) software application.

The virtual session indexer (VSI) application enables organizations to test and compare the performance of different software and hardware solutions in their own environment. The VSI application helps to decide the optimal hardware configuration (right sizing) to support the desired number of users and applications. Not based on guesswork but based on objective data.

The VSI application calculates the VSIMax index. Various calculations in different embodiments yield a VSIMax Classic, a VSIMax Dynamic and a VSIMax v4. Using an index such as the VSIMax v4, users are able to determine the maximum capacity of the current production infrastructure. The simulated users work with the same applications as the average employee such as Word, Excel, Outlook and Internet Explorer. If required, it is possible to add custom applications to the tests. The VSI application further allows organizations to test and predict the impact of any change in software and hardware on the performance of a VDI or SBC Infrastructure.

The present technology can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

In one example, the present technology relates to a method for evaluating performance and/or capacity of server based computing or virtual desktop infrastructure, the method comprising: a) loading the infrastructure with simulated user workloads; b) increasing the number of simulated users; and c) determining a capacity of the infrastructure when a response time, including a baseline response time and a fixed latency, exceeds a predetermined response time threshold due to the loading of the infrastructure in said step a) and increasing the number of simulated users in said step b).

In another example, the present technology relates to a method for evaluating performance and/or capacity of server based computing or virtual desktop infrastructure in a datacenter, the method comprising: a) performing a baseline phase to determine a baseline response time of the infrastructure under a low workload; b) loading the infrastructure with simulated user workloads; c) increasing the number of simulated users; and d) determining a capacity of the infrastructure when a response time, including the baseline response time and a fixed latency, exceeds a predetermined response time threshold due to the loading of the infrastructure in said step b) and increasing the number of simulated users in said step c).

In a further example, the present technology relates to a method for evaluating performance and/or capacity of server based computing or virtual desktop infrastructure in a datacenter, the method comprising: a) loading the infrastructure with simulated user workloads, the simulated workloads loaded in successive segments, each successive segment performing a number of actions taking a different length of time to perform; b) increasing the number of simulated users, each successive new simulated user performing a different segment first and then proceeding to perform successive segments; and c) determining a capacity of the infrastructure when a response time exceeds a predetermined response time threshold due to the loading of the infrastructure in said step a) and increasing the number of simulated users in said step b).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present technology will now be described with respect to the figures, which in general relate to a system and method for simulating user load and evaluating performance and/or capacity of SBC or VDI solutions. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
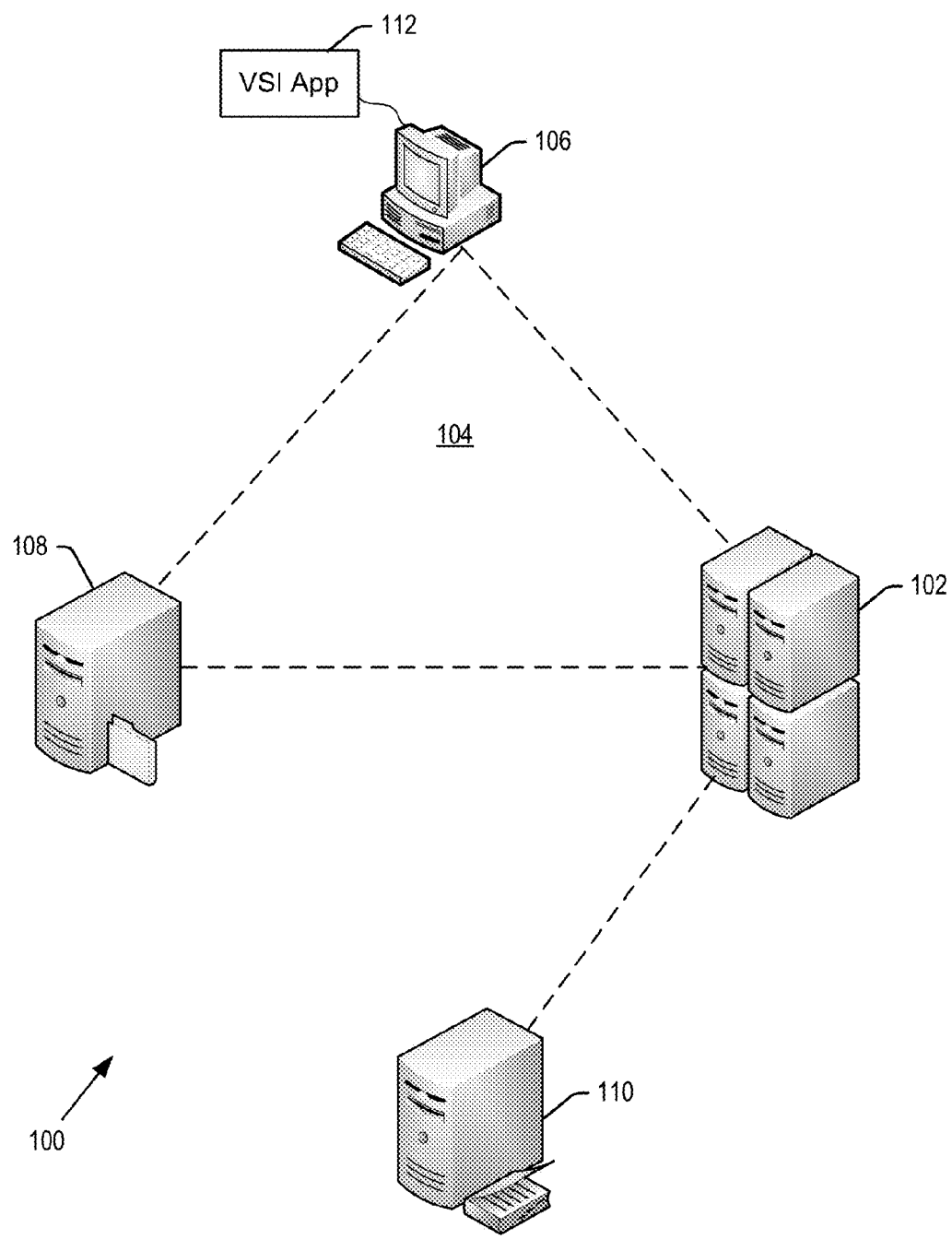
FIG. 1 is a block diagram of a network architecture on which the present technology may be implemented.

Referring to FIG. 1, there is shown a high level block diagram of a network architecture 100 in which the present technology may be implemented. In one configuration, the architecture may include a target platform 102 which provides virtualized Windows desktops, for example either VDI or SBC, hosted in a datacenter to end users. These virtual desktops are hosted in the central datacenter and accessed by users remotely through a remote display protocol over a network 104 such as a LAN, WAN, mobile broadband and the Internet. Both the VDI and SBC desktops run on shared server hardware in the datacenter. A hypervisor creates and runs virtual machines in the datacenter, and makes it possible to run multiple virtual instances of a Windows desktop.

The architecture 100 may further include launcher workstations 106 connected to the target platform 102 via the network 104. The launcher workstations may be the Windows desktop instance where the Login VSI sessions are initiated and launched from. Typically the launcher is running as a virtual desktop, but physical Windows machines are also supported. There may be at least one launcher workstation configured for 20-50 Login VSI sessions. This is dependent on the workload and protocol used, and may vary in further embodiments. In embodiments, instances of a virtual session indexer (VSI) software application 112 in accordance with aspects of the present technology may be resident on launcher workstations 106. The workstations 106 may execute the VSI application to automatically initiate the remote sessions to load the target platform as explained below.

The architecture 100 may further include an active directory (AD) controller 108 for test user accounts and standard policies. The controller 108 may create test user accounts, and a group policy objects (GPOs) may be imported and linked. The AD domain controller 108 authenticates and authorizes all (VSI test) users and Virtual Desktop computers in a Windows domain type network—assigning and enforcing security policies for all VSI users and computers.

A file share server 110 may further be included in architecture 100 for central configuration, and storing data generated by the VSI application. A file server is a Windows server that has the primary purpose of providing a location for central storage of the Login VSI runtimes and configuration files, the shared Login VSI document and media library and acts as the primary location where the Login VSI results from the test are stored.

In general, the VSI application controls the running of scripts simulating user workloads on the target platform and evaluates the performance and capacity of the target platform to run the scripts. The VSI application performs benchmarks for SBC or VDI workloads through system saturation. The VSI application loads the system with simulated user workloads using well known desktop applications like Microsoft® Office, Internet Explorer® and Adobe PDF Reader®. By gradually increasing the amount of simulated users, the system will eventually be saturated. Once the system is saturated, the response time of the applications may increase significantly. This latency in application response times is used as an indicator as to whether the system is overloaded or close to being overloaded. As such, the VSI application nearly overloads a system, and by so doing, provides information on what the true maximum user capacity is for the system.

VSIMax

The VSI application outputs a VSIMax value, also referred to as just VSIMax herein. The VSIMax is a measure, or index, of the maximum active session/desktop capacity. This index simplifies comparisons and makes it possible to understand the true impact of configuration changes on the hypervisor host or guest level.

Server Side Response Time Measurements

A design choice has been made in the VSI application to execute the workload directly on the target system within the session instead of using remote sessions. The test applications, or scripts, simulating the workloads are performed as a compiled AutoIT script on the target system, and are initiated at logon within the simulated user's desktop session context.

In an alternative embodiment, user actions may be generated client side through the remoting protocol. Remoting protocols like Microsoft RDP and Citrix ICA/HDX support this. These methods are specific to a product and vendor dependent. With changes on a protocol level or with new remoting solutions, the VSI application may need to be revised/expanded to support these changes.

However, in most instances, the choice has been made to execute the scripts completely server side with AutoIT. This is a platform independent solution. The relative overhead and footprint of AutoIT is small enough (1-5% range) for the VSI application's purposes.

Calculating the VSIMax

As explained below, the VSI application loads an SBC or VDI infrastructure with simulated workloads for a number of simulated users, where the number of users is increased over time. VSIMax may be a measure of the number of simulated users executing simulated workloads on the SBC or VDI infrastructure when a predetermined response time threshold is reached or exceeded. In embodiments, the simulated desktop workload is scripted in a 48 minute loop when a simulated VSI user is logged on, and performing generic activities within the test applications that have been opened such as Microsoft® Office. After the loop is finished it may restart automatically. Within each loop the response times of six specific operations are measured in a regular interval: twelve times within each loop. It is understood that the number of specific operations may be more or less than six, and that the number of times operations are measured in a regular interval may be more or less than 12. The response times of these six operations are used to determine VSIMax.

The six operations from which the response times are measured may be:

Starting "the VSI Notepad"

This operation is handled by the OS (loading and initiating the VSI application Notepad.exe) and by the VSINotepad.exe itself through execution. This operation seems almost instant from an end-user's point of view.

Starting the "File Open" Dialogue

This operation is handled in part by opened test application (such as Microsoft® Word) and part by the operating system. The file open dialogue uses generic subsystems and interface components of the OS. The OS provides the contents of this dialogue.

Starting the "Print" Dialogue

This operation is handled in part by the OS subsystems, as the print dialogue is provided by the OS. This dialogue loads the print-subsystem and the drivers of the selected printer. As a result, this dialogue is also dependent on disk performance.

Compress the Document into a Zip File with 7-Zip Command Line (2×)

This operation is handled by the command line version of 7-zip (or other file compression algorithm). The compression will briefly spike CPU and disk IO. This operation may be performed twice: once with no compression (JO intensive) and with high compression (CPU intensive).

Starting Microsoft® Word with a Document

This operation will measure the responsiveness of the Operating System and the file system. Microsoft® Word is started and loaded into memory, also the new document is automatically loaded into Microsoft® Word. When the disk IO is extensive or even saturated, this will impact the file open dialogue considerably. It is understood that the use of Microsoft® Word here is by way of example only and that other test applications may be used.

These measured operations with the VSI application impact considerably different subsystems such as CPU (user and kernel), Memory, Disk, the OS in general, the application itself, print, GDI, etc. These operations are specifically short by nature. When such operations become consistently long: the system is saturated because of excessive queuing on any kind of resource. As a result, the average response times will then escalate. This effect is clearly visible to end-users. If such operations consistently consume multiple seconds, the user will regard the system as slow and unresponsive.

Figure 2:
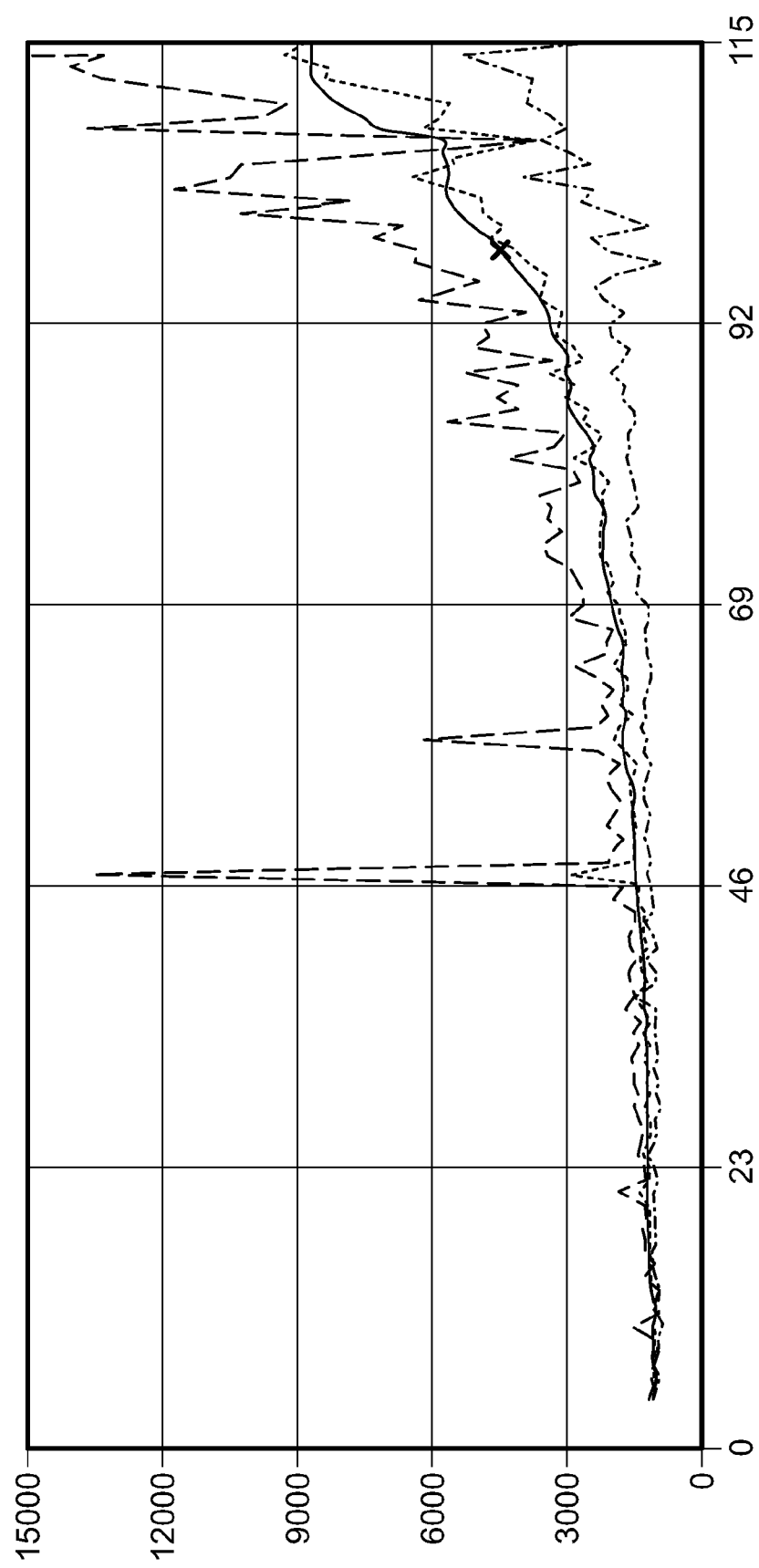
FIGS. 2 and 3 are graphs showing user load over time.

The chart of FIG. 2 shows an example VSI analyzer result graph of a test performed with Login VSI. This example test ran without serious performance issues. The vertical axes indicates the VSI response time in milliseconds, the horizontal line displays the amount of VSI users active on the system. The line with "x"s indicates the lowest VSI response time. The line with triangles indicates the highest VSI response time. The line with "o"s indicates the average response time. The line with squares indicates the calculated VSIMax response time. In this example, it is clear the average VSI response times up to 90 sessions do not exhibit extreme latency. After approximately 95 sessions the response times increase significantly. VSIMax is calculated at 92 sessions by the VSI application.

Figure 3:
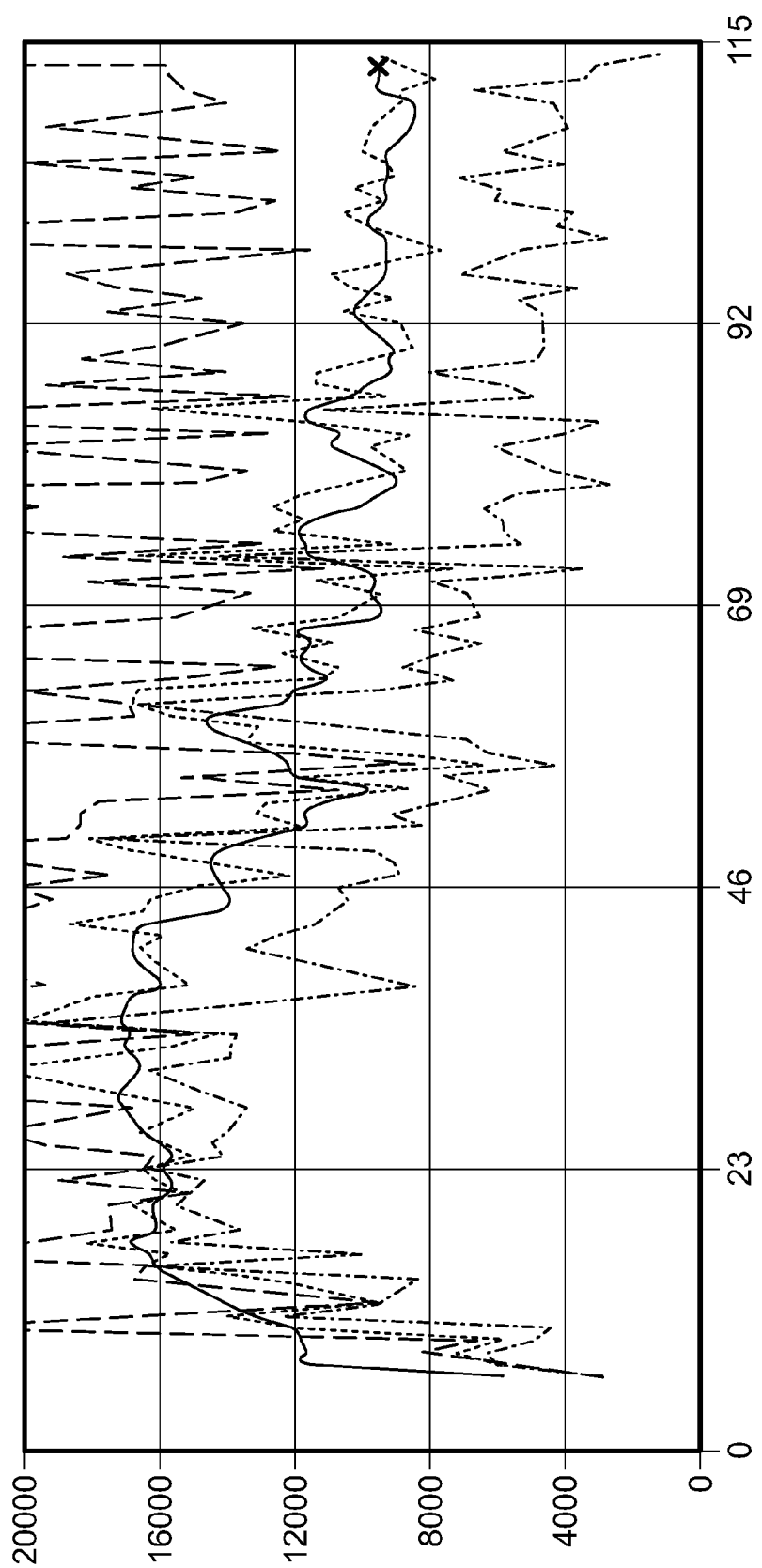

The chart of FIG. 3 shows an example result of the similar VSI test as mentioned in FIG. 2, where an antivirus agent is installed within the desktops. Because this is a default anti-virus agent installation, it has a considerable performance overhead, and has a negative impact on response time of all applications. Real-world users would consider this system too slow to be productive. The VSI application may not be able to calculate VSIMax in this example.

The VSI application allows users to choose between different VSIMax indexes: 'VSIMax Classic,' 'VSIMax Dynamic' and 'VSIMax v4.' VSIMax Classic and VSIMax Dynamic may be suitable for smaller systems, where VSIMax v4 gives better insight in system performance and scales to extremely large systems.

VSIMax Classic

VSIMax Classic is achieved when the average VSI response time is higher than a fixed threshold of 4000 ms. This method proves to be reliable when no anti-virus or application virtualization is used. In order to calculate the response times the seven activities are totaled (where VSIMax V4 may use six operations, VSIMax Classic may use seven operations). To balance these, measurements are weighted before they are summed. Within VSIMax Classic, two measurements may be weighted before they are added to the total VSIMax response time. For example, where a test application is Microsoft® Word:

'Starting Microsoft Word with a document' may be divided by two (i.e., weighted at 50%)

'Starting the "Search and Replace" dialogue' may be multiplied by five (i.e. weighted at 500%)

A sample of the VSIMax Classic response time calculation is displayed in Table 1 below:

TABLE 1

| Activity (Row Name) | Result (ms) | Weight (%) | Weighted Result (ms) |
|---|---|---|---|
| Refresh document (RFS) | 160 | 100% | 160 |
| Start Word with new doc (LOAD) | 1400 | 50% | 700 |
| File Open Dialogue (OPEN) | 350 | 100% | 350 |
| Start Notepad (NOTEPAD) | 50 | 100% | 50 |
| Print Dialogue (PRINT) | 220 | 100% | 220 |
| Replace Dialogue (FIND) | 10 | 500% | 50 |
| Zip documents (ZIP) | 130 | 100% | 130 |
| VSIMax Classic Response Time | | | 1660 |

Then the average VSIMax response time may be calculated based on the amount of active users logged on to the system. When the average VSIMax response times are consistently higher than the default threshold of 4000 ms, VSIMax is achieved. It is understood that thresholds may be above or below 4000 ms in further embodiments.

In practice, tests have shown a substantial increase of application response time when antivirus and/or application virtualization is used. The baseline response time is typically around 1400-1800 ms without application virtualization or antivirus. However, when anti-virus or application virtualization is used, the baseline response time varies between 2500-3500 ms. When the baseline response time is already so high, the VSIMax Classic threshold of 4000 ms may be too easily reached. 'VSIMax Classic' will report a maximum long before system resources like CPU, RAM or disk are actually saturated. This issue is addressed in the VSIMax Dynamic index.

VSIMax Dynamic

Similar to VSIMax Classic, VSIMax Dynamic is calculated when the response times are consistently above a certain threshold. However, this threshold is now dynamically calculated based on the baseline response time of the test. In one example, five individual measurements are weighted to better support this approach. The following lists the measurements and weights. The weights provided are by way of example and may vary above or below the values listed. Moreover, measurements may be used in addition to or instead of those listed.

Copy new doc from the document pool in the home drive: 100%
Microsoft Word with a document: 33.3%
Starting the "File Open" dialogue: 100%
Starting "Notepad": 300%
Starting the "Print" dialogue: 200%
Starting the "Search and Replace" dialogue: 400%
Compress the document into a zip file with 7-zip command line 200%

A sample of the VSIMax Dynamic response time calculation is displayed in Table 2 below:

TABLE 2

| Activity (Row Name) | Result (ms) | Weight (%) | Weighted Result (ms) |
|---|---|---|---|
| Refresh document (RFS) | 160 | 100% | 160 |
| Start Word with new doc (LOAD) | 1400 | 33.3% | 467 |
| File Open Dialogue (OPEN) | 350 | 100% | 350 |
| Start Notepad (NOTEPAD) | 50 | 300% | 150 |
| Print Dialogue (PRINT) | 220 | 200% | 440 |
| Replace Dialogue (FIND) | 10 | 400% | 40 |
| Zip documents (ZIP) | 130 | 200% | 260 |
| VSIMax Dynamic Response Time | | | 1867 |

Then the average VSIMax response time is calculated based on the amount of active users logged on to the system. For this, the average VSIMax response times need to consistently higher than a dynamically calculated threshold. To determine this dynamic threshold, first the average baseline response time is calculated. This is done by averaging the baseline response time of the first 15 users on the system.

The formula for the dynamic threshold is:

$$\text{Avg. Baseline Response Time} \times 125\% + 3000 \text{ ms.}$$

As a result, when the baseline response time is 1800, the VSIMax threshold will now be 1800×125%+3000=5250 ms. The multiplier of 125% may be varied above and below that in further examples, and the constant of 3000 ms may be varied above or below that in further examples. The baseline response time can vary per vendor and streaming strategy, especially when application virtualization is used.

VSIMax v4

The VSI application further provides the option of calculating the VSIMax v4 index. The VSI application for calculating VSIMax v4 is referred to herein as either the VSI application as above, or the 'VSI application v4.' An increased loop length of, for example, 48 minutes may be used. In VSI Max Classic and/or Dynamic, the loop length may for example be 14 minutes. With 14 minutes, operations were performed but in a compressed manner. Using a loop length of 48 minutes more closely emulates user activity and decreases the amount of application starts to more realistic proportions.

By segmenting the medium workload in four parts of 12 minutes and alternating the starting segment for each new test user, the 48 minute workload loop still is suitable for benchmarking. This ensures the system is loaded by different activities from the first users up to the last. For example, without segmenting the workload, certain more resource intensive parts (like multimedia) may happen at the end of the test, and just for a limited set of users. When the segment start is alternated for each new user, all activities in the workload are used from the beginning of the test.

To further increase the realism of the workload, the data is not stored within the Windows image, but on a separate data server. The total dataset for the VSI application v4 may be 20 GB (in other embodiments, the dataset may be smaller, for example 300 MB), with a dataset of 1000 office documents of each type. Also, the document size may be considerable larger in this embodiment, typical for documents seen today.

The launch window for all sessions may be fixed to 48 minutes when the VSIMax v4 is calculated. This makes the logon rate of test users dependent on the total amount of users. The fixed launch window makes it possible to test a system with the VSI application v4 with 100 users, 100,000 users, and any number of users in between. This range is by way of example, and the VSI application v4 may be used to test larger or smaller numbers of users.

In other embodiments of the VSI application, the baseline response time measurement was performed during the actual start of a test. This could easily affect the baseline performance because the workload itself already has considerable impact on system resources and consequently affect the baseline measurement. To address this, the VSI application v4 introduces the baseline phase. By first loading 5 test users on the system before the workload is executed, and only measuring the VSI response time of the system while there are no other activities, the baseline performance is consistent and not affected by the workload.

The weighting and the actions to measure the VSI application v4 response time have been changed to better represent system performance. In other embodiments, the application start of Microsoft® Word, for example, dominated the overall response time. In the VSI application v4, measurements have an equal weight. This will highlight performance issues on all levels: CPU, memory, Disk IO, on application and OS level.

The calculation of VSIMax v4 by the VSI application v4 is different than for calculating VSIMax Classic and VSI-Max Dynamic. The (weighted) response time latency threshold is now fixed. The emphasis of the VSI application v4 lies on the response time latency, and not on the total response time, like it is in other embodiments. It is now possible to compare radically different systems, independent of the (infrastructure) software running like antivirus, security, application virtualization or other plug-ins.

The VSI application v4 will report on session density together with baseline response time. The baseline performance will indicate what best performance an individual user can expect. This is not connected to the session density. A fast dual core system easily gives the individual user better performance than a system with slower 10 core CPU. However, the 10 core CPU system will easily have a much larger user capacity. By reporting both the VSIMax v4 (higher is better) and Baseline response time performance (lower is better), a much better understanding of the systems capabilities is given.

The VSI Application v4 Overview

Figure 4:
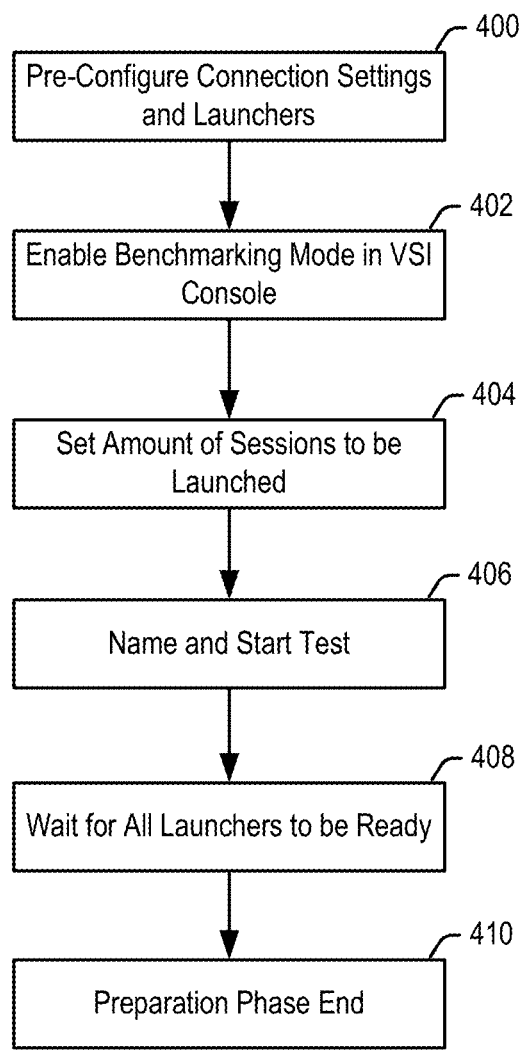
FIGS. 4-8 are flowcharts showing the operation of an embodiment of the present technology.

The flowchart of FIG. 4 represents the mechanics of a VSI application v4 test. consist generally of:

Pre-Configure Connections Settings & Launchers
Start Baseline response time measurement
Start the VSI application test
Execute Medium Workload
Start Segment
Preparation Phase Referring now to the flowchart of FIG. 4, in the preparation phase the system to be tested is prepared for the test. The tested pool of desktops is pre-booted. All desktop virtual machines (VDI) or server virtual machines (SBC) are started and ready to receive the VSI application test user sessions.

Step 400: Pre-Configure Connection Settings and Launchers

The VSI application supports any VDI and SBC solutions through the universal connection configuration wizard. To automatically initiate the sessions on the launchers, the client software needs to be operated through a command-line interface, this is configured in the VSI application management console.

Step 402: Enable Benchmarking Mode in the VSI Application Console

This limits configuration options and forces 48 minute launch window and medium workload. This VSI application v4 routine is suited for current and future generations of hardware and for both server sizing and farm sizing. The sessions are launched within a specific timeframe, for example 48 minutes. This timeframe equals the logon rate typical for a busy morning in most organizations and 48 minutes is the total length of the user simulation loop. The first users will have completed the total workload by the end of the test. The launching of these sessions may be equally distributed in time (though it need not be in further embodiments). The launching interval may be:

2880 seconds(48 Minutes)/total launched
sessions=launching interval per session.

This session launching regime has a couple of advantages in comparison to other embodiments of the VSI application and conventional benchmark applications for hosted desktop virtualization. In other embodiments of the VSI application, the VSIMax was established by launching 1 session every 30 seconds. But the server hardware capacity is continuously improving, specifically from a processor and memory point of view. As a result, the relative load from the logon process (which is an important part of the workload and consumes considerable resources) decreases when a server is configured with a CPU with more processor core. The relative load on the individual processor is considerably lower on a server with 10 cores per CPU than a server with 4 cores per CPU.

Also, a fixed interval of 30 seconds per user sessions is not as practical with larger scale test. For example in 2010, it was normal to host around 100 desktop sessions on the typical server hardware of that time. Currently, it is close to 200 per server. The duration of the test doubles because of the increase of the capacity of modern systems. This trend continues steadfastly, and is unlikely to stop in the future. So it can be expected that 300-400 the VSI application sessions is the norm, for example in 2015.

Especially with testing large scale environments, it is impractical to have a launch interval of 30 seconds between each session. When for instance 1000 sessions are launched it would take 30,000 seconds; more than eight hours to fulfill a test.

By implementing a fixed launch window in the VSI application v4, any virtual desktop environment, from a single server to a very large environment, can be fully tested. Because of the fixed interval the relative logon rate remains equal even when the capacity is considerable larger.

Step 404: Set Amount of Sessions to be Launched

For the test, the amount of sessions configured to be launched is the same as the available desktop virtual machines. When VDI is tested, configuring more sessions than desktop virtual machines is technically not possible: every virtual machine can only run one session. Configuring less sessions than the available virtual machines in the desktop pool is not preferred, since the virtual machines not loaded by a session do consume resources, but are not part of the test.

Step 406: Name and Start Test

The VSI application console will ask for a name and a description of the test.

Step 408: Wait for all Launchers to be Ready

Before a test is started, all launcher machines need to be ready and waiting for the test initiation. When all launchers are ready, the baseline performance of the system can be measured.

The preparation phase is concluded in step 410.

VSI Application v4 Baseline Response Time Measurement

Step 500: Start Baseline Response Time Measurement

Figure 5:
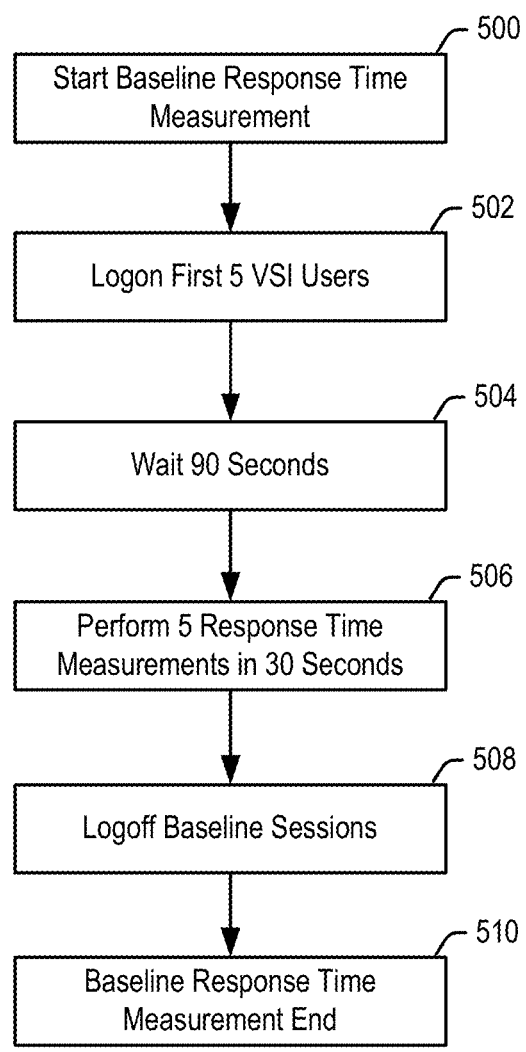

Referring now to the flowchart of FIG. 5, it is a feature of the VSI application v4 to measure the baseline performance of the system. This allows the VSI application v4 to measure the latency of the response time under load. The baseline performance of the system is the best response that the system can provide to end-users. This is measured without performing the regular workload in the VSI application v4. Only the VSI response time is measured during this phase, no other activities are happening on the system.

With other embodiments of the VSI application, the baseline response time is measured while the workload was executed. Because the workload is resource intensive, the baseline performance could be easily affected. By separately measuring the baseline performance before the actual test start in the VSI application v4, the results are the most optimal and not influenced by the workload itself.

Step 502: Logon First Five of the VSI Application Users

To measure the baseline performance, first five regular the VSI application test users (i.e., simulated users) are logged on the system.

Step 504: Wait 90 Seconds

Each user waits 90 seconds before the VSI response time is measured. This allows the system to 'rest' and finish logon processes that are happening in the background. It is understood that time periods longer or shorter than 90 seconds may be used in further embodiments.

Step 506: Perform Five Response Time Measurements in 30 Seconds

After 90 seconds, each simulated user performs five response time measurements within a 30 second time frame. Because no other activities are happening on the system, the VSI response time measurement will give the most optimal results, with minimal deviation. In one example, the five measurements may be:

Load new document in Microsoft® Word
Start File Open Dialogue
Load Text file in Notepad
Start Print dialogue
Zip PST file.

Other measurements may be taken instead of or in addition to these measurements in further embodiments.

Step 508: Logoff Baseline Sessions

Once the baseline performance is measured, the baseline sessions are logged off so they can participate in the regular workload in the VSI application test.

The baseline measurement phase concludes in step 510.

VSI Application Test

Figure 6:
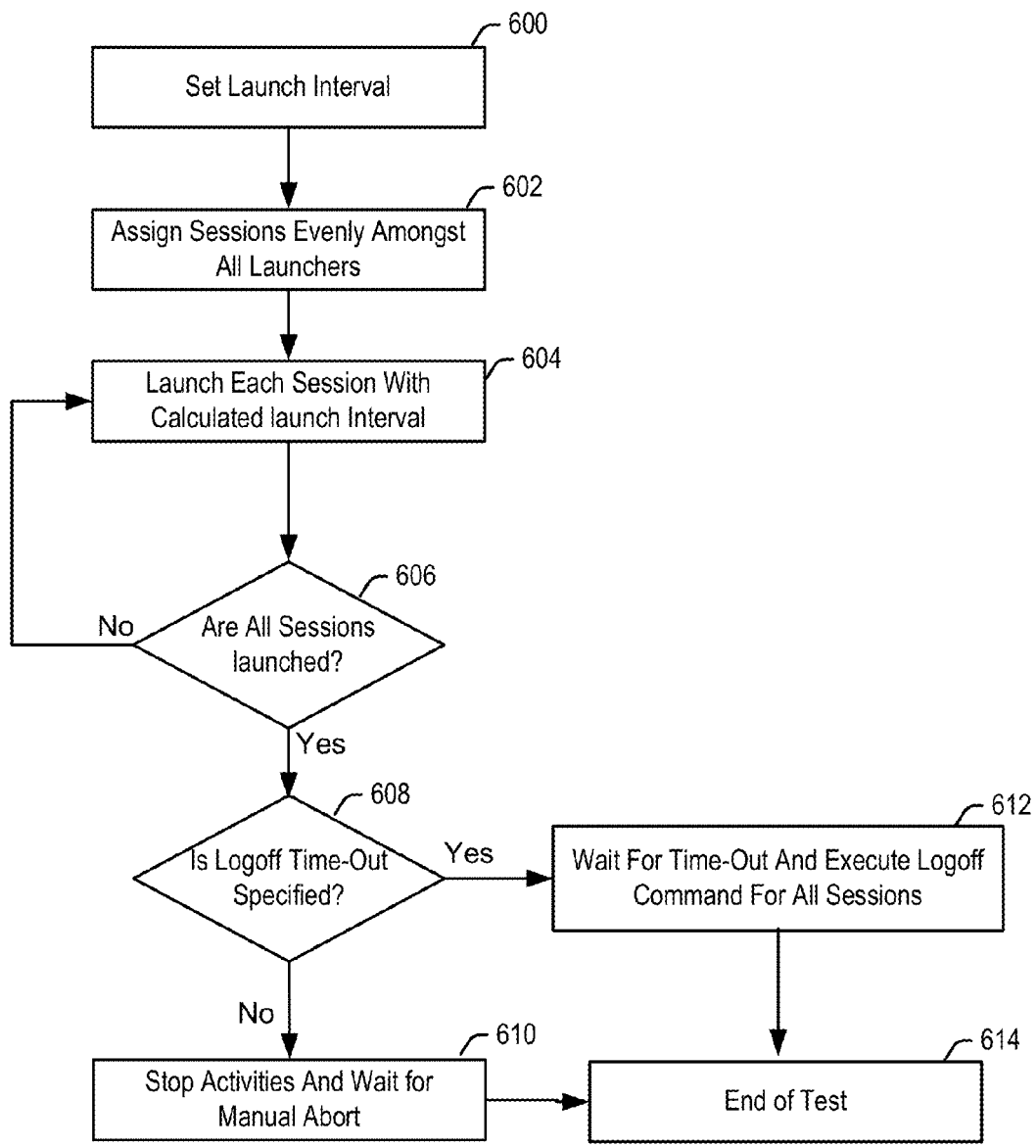

Referring now to the flowchart of FIG. 6, after the baseline measurement phase, the system is ready for the VSI application test. Within the VSI application v4, there are multiple workloads available: light, medium, heavy and multimedia. When the VSI application v4 is used for benchmarking, the medium workload may be executed.

Step 600: Set Launch Interval

The launch interval is set in step 600. In embodiments, the launch interval may be set by dividing the launch window, which may be 48 minutes (2880 seconds), by the total sessions. For instance if 200 users are configured for the test, then the launch interval per session is 2880/200=14.4 seconds between each session.

Step 602: Assign Sessions Evenly Amongst all Launchers

Launching a remote desktop session also uses considerable resources on the client side. Typically, it is recommended not to launch more than 50 sessions per launcher, but this limit is highly dependent on the protocol used and capabilities of the system where the client is running The VSI application may automatically distribute and load balance equally all sessions amongst the available launchers. This will reduce the load on the individual launchers during the test.

Step 604: Launch Each Session with Calculated Launch Interval

The VSI application test is now initiated, using the calculated launch interval for each session. In this step, the VSI application v4 may launch a medium workload for user x on a target VDI/SBC desktop. Further details of step 604 are explained below with respect to the flowchart of FIG. 7.

Step 606: Are all Sessions Launched?

Step 606 checks whether all sessions are launched. If not, the VSI application returns to step 604 to launch a new session. If so, the flow continues to step 608. Given the definition of the launch interval in step 600, after 48 minutes, all sessions are launched by the VSI application.

Steps 608, 610 and 612: Is Logoff Time-Out Specified?

In the VSI application management console a logoff time-out can be specified. If a logoff time-out is not specified, the workload will continue after the last session has been launched until a manual abort instruction is received in step 610. On the other hand, if a logoff time-out has been specified, the system logs off all sessions once that specified time period after the last session has launched. For instance, if logoff time-out has been configured to 600 seconds, all sessions remain logged on for 10 minutes after the last session has been launched. Once these 10 minutes have passed, all sessions are automatically logged off.

The VSI application test ends in step 614.

Additional Detail of Step 604: Workload Execution

Figure 7:
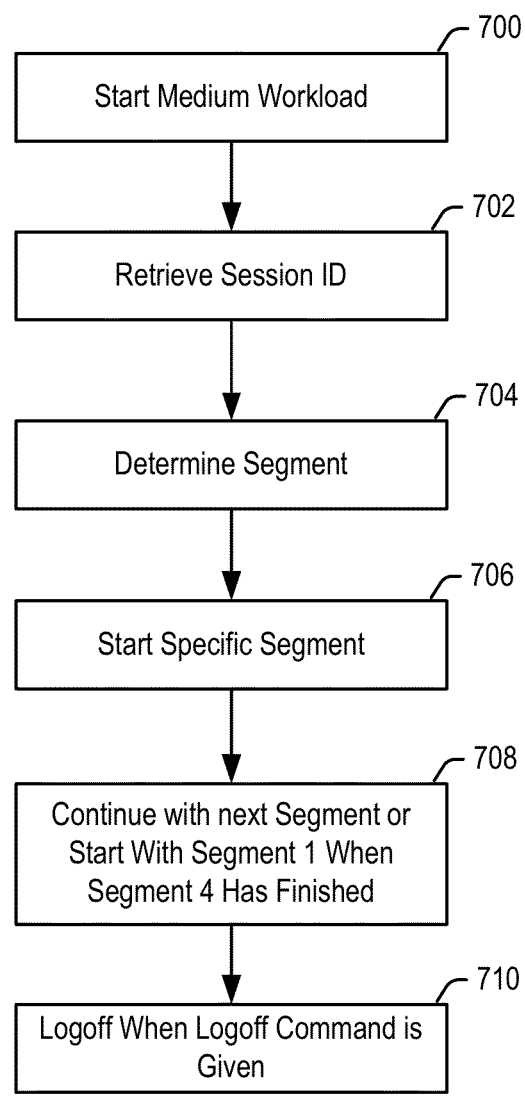

The flowchart of FIG. 7 provides additional detail step 604 (FIG. 6). There are multiple workloads within the VSI application v4. In an embodiment, the VSI application v4 uses the medium workload. This workload simulates an average resource user in a 48 minute loop. Once the workload is finished, it will restart the loop, as long as the whole test is active.

In embodiments, the workload is segmented in four equal parts of 12 minutes. Each segment represents phases of productivity with different test applications. Each subsequent user will start its workload at the next successive segment; that is: user 1 will start segment 1; user 2 will start segment 2; user 3 will start segment 3; user 4 will start segment 4; user 5 will start segment 1; user 6 will start segment 2; etc.

Without segmenting, the workload applications used at the end of the simulation loop would hardly be used during a VSI application test. Because the workload is started in segments by each users, all applications and all phases of productivity are equally used and tested during a 48 minute test.

Having segments allows the overall user simulation loop length to be much longer and therefore more realistic. In other embodiments of the VSI application, the workload of all test applications were started and used within a 12 to 14 minute timeframe. This is not similar to real-world behavior. Within the VSI application v4, the workload is now 48 minutes, so the amount of application starts in time is reduced in comparison to other embodiments of the VSI application. The VSI application v4 workload remains a 'high watermark' workload: this helps understanding the real world limits of the system. But, the new the VSI application v4 reduced amount of application starts and prolonged editing time in applications make it much more realistic.

Steps 700 and 702: Start Medium Workload and Retrieve Session ID

The medium workload for a session is started in step 700. As noted, it may be other workloads (low, high, multimedia) in further embodiments. Once a VSI application user is logged on the system, it will retrieve its session ID. This is the number of active sessions which are running on the system when the user logged on and started the VSI application workload.

Step 704: Determine Segment

Based on the session ID, the starting segment is chosen for the user. This is not randomized, but pre-determined. Randomization of the workload is not preferred for benchmarking purposes; the results need to be identical if the test is performed repeated on the same system. However, it is conceivable that workload be randomized in further embodiments.

Step 706: Start Specific Segment

A specific segment is started in step 706. Different actions may be performed in each of the respective segment. In one example:

Segment 1 performs:
Starting Outlook: browse & edit messages
Start Internet Explorer and browse pages
Segment 2 performs:
Start and review PDF in adobe acrobat
Review and edit document in Word
Print document to PDF
Segment 3 performs
Starting excel and edit sheet
Load Freemind® mindmap from pool and review and edit
Start Microsoft® PowerPoint presentation from pool, review and edit
Segment 4 performs
Browse website in Internet Explorer
Start Flash Game
Review two 480p Trailer movies
Review photos from pool in the VSI application photoviewer The above-described actions may vary in embodiments, both with respect to the specific actions performed (other actions may be added or substituted) and the order in which they are performed.

Step 708: Continue with Next Segment or Start with Segment 1

Once a segment is finished the workload will continue with the next segment. When segment 4 is finished, all test applications are closed and then segment 1 is started again.

Step 710: Logoff when Logoff Command is Given

Sessions are logged off when the logoff command is given. Until the logoff command, all sessions will continue and repeat the workload. The logoff command is as described above in steps 610 and 612.

Segment and VSI Response Time Mechanics

Figure 8:
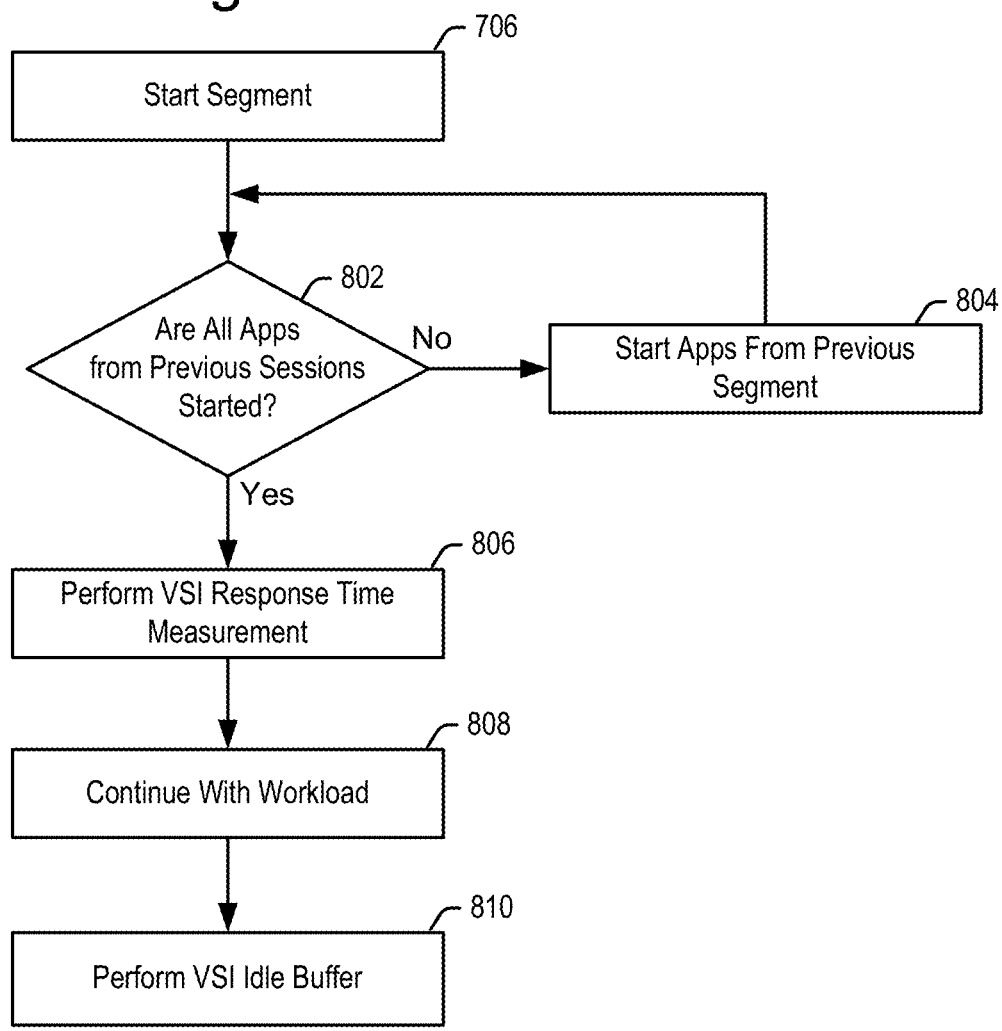

Referring now to the flowchart of FIG. 8, the VSI application v4 measures response times of the CPU and components as actions are performed in the testing applications within each session.

Steps 802, 804: Are all Open Applications from Previous Segments Started?

After a segment is started, as described above in step 706, the VSI application checks whether all applications from a previous segment have been started in step 802. For example, if the segment which is started is segment one, there may be no other previous segments. However, if the segment which is started is segment 3, the VSI application may check to confirm that the applications from both segments 1 and 2 are started and running in the background. If applications are not started in a previous segment, they will be first started in step 804 before the current segment is continued. This ensures that the relative load of a segment is always the same, even when it was the first started.

Step 806: Perform the VSI Response Time Measurement

In an example, the VSI response time is measured three times during each segment. The response time may be measured more or less times in a segment in further embodiments. In the VSI application v4, the measurements have been optimized to better represent system performance in comparison to other embodiments. Also, the weighting of the measurement has been altered to better represent performance bottlenecks. The following actions may be part of the VSI application v4 response time measurement:

Start the Notepad application with large text file
Start File Open Dialogue
Start Print dialogue
Zip PST file without compression
Zip PST file with high compression
Start Microsoft® Word with new document from document pool.

The starting time of these operations are stored in the VSI application share for later analysis. It is understood that other operations may be performed in addition or instead of these operations in further embodiments.

Step 808: Continue with Workload

After the VSI response time measurement, the workload is continued, simulating real world user actions, like starting applications, browsing and editing documents.

Step 810: Perform the VSI Application Idle Buffer

The VSI application idle buffer ensures the workload has the same impact on the system while the system is stressed. Once the system is stressed, user actions in the workload will take more time to execute. The idle time buffer is automatically adjusted (reduced) so the total length of the workload segment may always be 12 minutes. As noted, where a loop is longer or shorter than 48 minutes, the length of a segment may vary accordingly (to be ¼ of the loop).

The VSIMax v4 Calculation

Once the test is finished, the VSIMax v4 can be calculated. Other embodiments of the VSIMax (Classic and Dynamic) could not be calculated when the system was not saturated. In the VSIMax v4, this is not a requirement. When the system is not saturated, and it could complete the full test without exceeding the average response time latency threshold, the VSIMax v4 would be considered the maximum of active sessions that were launched.

In embodiments, the following actions are part of the VSIMax v4 calculation:

Start the VSI application Notepad with large text file
Start File Open Dialogue
Start Print dialogue
Zip pst file without compression
Zip pst file with high compression
Start Microsoft® Word with new document from document pool It is understood that other operations may be performed in addition or instead of these operations in further embodiments.

The response times may be different per measurement type. Accordingly, the response time of these actions may be weighted before they are added to the total. Weighting is applied to ensure that the response times for the different operations have equal impact in the total response times. For instance, Zip with compression can be around 2800 ms, while the Zip action without compression can only take 75 ms. The Zip with compression may be weighted with a small multiplier, and the Zip action without compression may be weighted with a larger multiplier. This ensures that each activity has an equal impact on the total response time.

In comparison to alternative embodiments of the VSIMax, this weighting better represents system performance. In contrast to the VSI Classic and Dynamic indices, all actions have the same or similar weights in the VSIMax v4 total. In both in the VSIMax classic and Dynamic indices, the opening of, for example Microsoft® Word had far greater impact on the total than other activities. The following actions and weighting of the response times are applied in one example of the calculation of VSIMax:

Start the VSI Notepad with large text file: 0.5
Start File Open Dialogue: 4
Start Print dialogue: 1.25
Zip PST file without compression: 6
Zip PST file with high compression: 0.175
Start Microsoft® Word with new document from document pool: 0.15

This weighting is applied on the baseline and normal VSI response times. These actions and assigned weights are by way of example only. Other actions may be added to or substituted for those shown, and other weights may be applied.

The average the VSIMax v4 baseline response time (also called the VSI base) in the VSI application v4 is calculated from the results recorded in the baseline phase (FIG. 4). In one example, a total 30 VSI response time samples are takes by 5 baseline sessions. To ensure the VSI base represents the optimal performance of the system, the highest 15 results may be removed from the average calculation. To ensure no fluke low measurements are affecting the results unrealistically, the bottom 2 results are removed from the average the VSI base calculation. The number of discarded high and low values may vary in further embodiments. The average the VSIMax baseline response time, VSI base, is calculated over the remaining 13 VSI response time measurements. The VSIMax average response time in the VSI application v4 is calculated on the amount of active users that are logged on the system.

In an example, five VSI response time samples are averaged +40% of the amount of "active" sessions. For example, if the number of active sessions is 100, then the latest 5+40 (40% of 100)=45 response time measurements are used for the average calculation.

To remove noise (accidental spikes) from the calculation, the top 5% and bottom 5% of the VSI response time samples may be removed from the average calculation, with a minimum of 1 top and 1 bottom sample. As a result, with 100 active users, the last 31 VSI response time samples are taken. From those 45 samples the top 2 samples are removed and lowest 2 results are removed (5% of 45=2.25, rounded to 2). At 60 users the average is then calculated over the 41 remaining results.

VSIMax v4 is reached when the VSI base+a 2600 ms latency threshold is reached by the average VSI response time result. The latency added to the VSI base may be more or less than 2600 ms in further embodiments. Depending on the tested system, the VSIMax response time can grow 2-3× the baseline average. In end-user computing, a 3× increase in response time in comparison to the baseline is typically regarded as the maximum performance degradation to be considered acceptable.

As noted, in the VSIMax Dynamic index, the latency threshold was dependent on the baseline measurement at the beginning of the test. 25% of the baseline measurement was added to a latency threshold. While this was not a problem with most tests, in some cases, especially when the systems performance was very close between two different configurations, the slower system might get a higher VSIMax score simply because the higher baseline results gave the slower system a higher latency threshold. In the VSIMax v4, this latency threshold is fixed to 2600 ms, which provides better comparisons between two different systems, especially when they have different baseline results. Ultimately, in the VSIMax v4, the performance of the system is not decided by the total average response time, but by the latency the system has under load. For all systems, this may be 2600 ms (weighted). As noted, it may be higher or lower than that in further embodiments.

The threshold for the total response time is: average weighted baseline phase response time+2600 ms. When the system has a weighted baseline response time average of 1500 ms, the maximum average response time may not be greater than 4100 ms (1500+2600). If the average baseline is 3000, the maximum average response time may not be greater than 5600 ms (3000+2600).

In embodiments, the VSIMax v4 is determined before the system has exceeded it threshold. For example, when the VSIMax average on the system has exceeded the VSI threshold at 80 users, the VSIMax will be 79.

When the threshold is not exceeded by the average VSI response time during the test, the VSIMax is now considered the maximum amount of users that was launched. This approach is fundamentally different in comparison to previous the VSIMax methods (Classic and Dynamic), as is it was always required to saturate the system beyond the VSIMax threshold.

The VSIMax v4 index may be reported with the average baseline VSI response time result. For example: "The VSIMax v4 was 125 with a baseline of 1526 ms." This helps in the comparison of systems and gives a more complete understanding of the system. The baseline performance helps to understand the best performance the system can give to an individual user. The VSIMax indicates what the total user capacity is for the system. These two are not automatically connected and related. For example, when a server with a very fast dual core CPU, running at 3.6 GHZ, is compared to a 10 core CPU, running at 2.26 GHZ, the dual core machine will give an individual user better performance than the 10 core machine. This is indicated by the baseline VSI response time. The lower this score is, the better performance an individual user can expect. However, the server with the slower 10 core CPU will have a larger capacity than the faster dual core system. This is indicated by the VSIMax v4, and the higher the VSIMax is, the larger overall user capacity can be expected.

The VSI application, test applications, data stores and components shown in FIG. 1 may each operate on a separate computing system, or two or more of these components may be combined into a single computing system. The computing system for any or all of these components can be any of various different types of computing devices. A sample computing environment 300 which may describe any of these is shown and described below with respect to FIG. 9. The inventive system is operational with numerous other general purpose or special purpose computing systems, environments or configurations. Examples of well-known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

Figure 9:
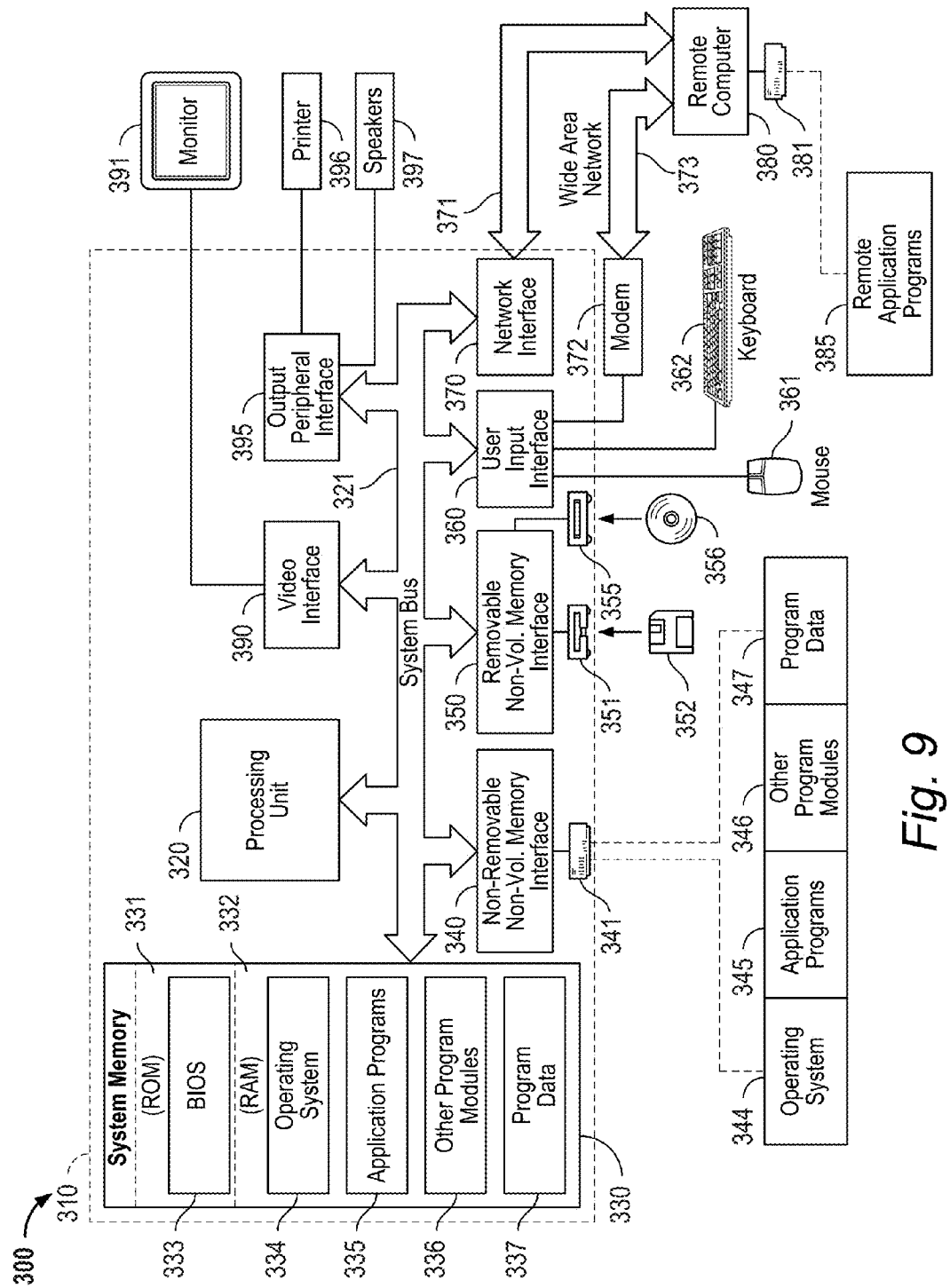
FIG. 9 is a block diagram of a computing system environment capable of implementing the present system.

With reference to FIG. 9, an exemplary system for implementing the inventive system includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 may include a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 330 includes computer storage media in the form of volatile and/or nonvolatile memory such as ROM 331 and RAM 332. A basic input/output system (BIOS) 333, containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 9 illustrates operating system 334, application programs 335, other program modules 336, and program data 337.

The computer 310 may also include other removable/non-removable, volatile/nonvolatile computer storage media. By way of example only, FIG. 9 illustrates a hard disc drive 341 that reads from or writes to non-removable, nonvolatile magnetic media and a magnetic disc drive 351 that reads from or writes to a removable, nonvolatile magnetic disc 352. Computer 310 may further include an optical media reading device 355 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 341 is typically connected to the system bus 321 through a non-removable memory interface such as interface 340, magnetic disc drive 351 and optical media reading device 355 are typically connected to the system bus 321 by a removable memory interface, such as interface 350.

The drives and their associated computer storage media discussed above and illustrated in FIG. 9, provide storage of computer readable instructions, data structures, program modules and other data for the computer 310. In FIG. 9, for example, hard disc drive 341 is illustrated as storing operating system 344, application programs 345, other program modules 346, and program data 347. These components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and a pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 9. The logical connections depicted in FIG. 9 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communication over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 9 illustrates remote application programs 385 as residing on memory device

381. It will be appreciated that the network connections shown are exemplary and other means of establishing a communication link between the computers may be used.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for evaluating performance and/or capacity of a server system infrastructure comprising a target system, wherein said server system infrastructure comprises at least one of a server based computing or virtual desktop infrastructure, the method comprising:
   a) loading the server system infrastructure with simulated user workloads;
   b) increasing the number of simulated users on the target system; and
   c) determining, based on controlling workload execution from within the target system using a server-side script, a capacity of the infrastructure when a response time, including a baseline response time and a fixed latency, exceeds a predetermined response time threshold due to the loading of the infrastructure in said step a) and increasing the number of simulated users in said step b).

2. The method of claim 1, wherein said step a) comprises the step of launching a number of test applications from a user workload and performing actions from within the number of test applications.

3. The method of claim 2, said step of launching a number of test applications comprises the step of launching two or more test applications from the group consisting of: word processors, web browsers, and document readers.

4. The method of claim 1, wherein the infrastructure is saturated when said step c) determines the capacity of the infrastructure.

5. The method of claim 1, wherein the infrastructure is not saturated when said step c) determines the capacity of the infrastructure.

6. The method of claim 1, wherein the baseline response time is determined in a baseline phase performed prior to said step a) of loading the infrastructure with simulated user workloads.

7. The method of claim 1, further comprising the step of outputting the baseline response time and a number of simulated users when the predetermined response time threshold is exceeded.

8. The method of claim 1, wherein said step a) comprises the step of loading the infrastructure with an average workload representing an average workload across a number of user workloads hosted by the infrastructure.

9. A method for evaluating performance and/or capacity of a server system infrastructure comprising a datacenter target system, wherein said server system infrastructure comprises at least one of a server based computing or virtual desktop infrastructure in a datacenter, the method comprising:
   a) performing a baseline phase to determine a baseline response time of the infrastructure under a workload below capacity;
   b) loading the server system infrastructure with simulated user workloads;
   c) increasing the number of simulated users in the datacenter target system; and
   d) determining, based on controlling workload execution from within the datacenter target system using a server-side script, a capacity of the infrastructure when a response time, including the baseline response time and a fixed latency, exceeds a predetermined response time threshold due to the loading of the infrastructure in said step b) and increasing the number of simulated users in said step c).

10. The method of claim 9, wherein the fixed latency is independent of the baseline response time.

11. The method of claim 9, wherein said step b) comprises the step of performing one or more of the following actions:
   e) starting a notepad application;
   f) starting a File Open dialogue;
   g) starting a Print dialogue;
   h) zipping a personal storage table file without compression;
   i) zipping a personal storage table file with high compression; and
   j) starting a word processor with new document.

12. The method of claim 11, wherein the times taken to perform each of the actions in steps e) to j) are weighted with respect to each other.

13. The method of claim 9, wherein the determined capacity of said step d) is reached when an average response time of the infrastructure to actions performed reaches the baseline response time plus a fixed latency of 2600 ms.

14. The method of claim 9, further comprising the step k) of capping the number of users added in said step c).

15. The method of claim 14, wherein the determined capacity of said step d) is equal to the capped number of users in said step k) where predetermined response time threshold is not yet exceeded in said step d) upon reaching the capped number of users in said step k).

16. A method for evaluating performance and/or capacity of server based computing or virtual desktop infrastructure comprising a datacenter, the method comprising:
   a) loading the infrastructure with simulated user workloads, the simulated workloads loaded in successive segments, each successive segment performing a number of actions taking a different length of time to perform;
   b) increasing the number of simulated users, each successive new simulated user performing a different segment first and then proceeding to perform successive segments; and
   c) determining, based on controlling workload execution from within the datacenter using a server-side script, a capacity of the infrastructure when a response time exceeds a predetermined response time threshold due to the loading of the infrastructure in said step a) and increasing the number of simulated users in said step b).

17. The method of claim 16, wherein response time includes a baseline response time and a fixed latency.

18. The method of claim 16, wherein the successive segments are executed in a loop that loops back to first segment after the last segment.

19. The method of claim 16, wherein there are four segments.

20. The method of claim 19, wherein each segment is 12 minutes long to provide a loop of 48 minutes.

* * * * *